United States Patent
Cocks et al.

(10) Patent No.: US 10,935,328 B2
(45) Date of Patent: Mar. 2, 2021

(54) PHASE CHANGE CELL

(71) Applicant: Eagle Technology, LLC, Melbourne, FL (US)

(72) Inventors: Rachele B. Cocks, Columbia City, IN (US); Robert E. Kartman, Fort Wayne, IN (US); Blaine L. Hershberger, Fort Wayne, IN (US); James A. Isca, Fort Wayne, IN (US)

(73) Assignee: Harris Corporation, Melbourne, FL (US)

( * ) Notice: Subject to any disclaimer, the term of this patent is extended or adjusted under 35 U.S.C. 154(b) by 63 days.

(21) Appl. No.: 16/234,012

(22) Filed: Dec. 27, 2018

(65) Prior Publication Data

US 2019/0128621 A1     May 2, 2019

Related U.S. Application Data

(62) Division of application No. 15/239,461, filed on Aug. 17, 2016, now Pat. No. 10,184,730.

(51) Int. Cl.
    *F28D 20/02*          (2006.01)

(52) U.S. Cl.
    CPC ........... *F28D 20/028* (2013.01); *F28D 20/02* (2013.01); *F28F 2255/04* (2013.01); *F28F 2260/02* (2013.01); *F28F 2265/12* (2013.01); *Y02E 60/14* (2013.01)

(58) Field of Classification Search
    CPC ........ F28D 20/028; F28D 20/02; F03G 7/065; F03G 7/06; Y02E 60/145; F28F 2265/26; G01K 5/62

USPC .......................................................... 165/10
See application file for complete search history.

(56) References Cited

U.S. PATENT DOCUMENTS

| | | | |
|---|---|---|---|
| 3,729,981 A | | 5/1973 | Grady et al. |
| 3,849,205 A | | 11/1974 | Brau et al. |
| 3,985,182 A | | 10/1976 | Hara et al. |
| 4,067,237 A | | 1/1978 | Arcella |
| 4,135,371 A | | 1/1979 | Kesselring et al. |
| 4,211,208 A | * | 7/1980 | Lindner .................. F28D 20/02 |
| | | | 126/400 |
| 4,799,537 A | | 1/1989 | Hoke, Jr. |
| 4,860,729 A | * | 8/1989 | Benson ................. F28D 20/028 |
| | | | 126/400 |

(Continued)

FOREIGN PATENT DOCUMENTS

JP            61195284 A      8/1986

*Primary Examiner* — Tho V Duong
(74) *Attorney, Agent, or Firm* — Edell, Shapiro & Finnan, LLC (57) ABSTRACT

A phase change cell includes a housing enclosing a phase change chamber that holds a phase change material and a gas pocket. The housing includes a side wall extending between first and second end walls. A capillary is disposed in an interior surface of the side wall. In response to heating of the phase change cell, the capillary is configured to draw the phase change material in a liquid phase towards the periphery of the phase change chamber. A temperature sensor is coupled to the housing in a vicinity of the capillary to measure the phase change temperature. According to another aspect, the housing includes a moveable surface that bounds a portion of the phase change chamber. The phase change temperature of the phase change material changes based on the position of the moveable wall.

5 Claims, 8 Drawing Sheets

(56) References Cited

U.S. PATENT DOCUMENTS

| | | | |
|---|---|---|---|
| 5,231,466 A | 7/1993 | Erskine et al. | |
| 6,572,807 B1 | 6/2003 | Fong | |
| 7,040,382 B2 | 5/2006 | Hsu | |
| 7,585,106 B2 | 9/2009 | Yamada et al. | |
| 7,837,382 B2 | 11/2010 | Yamada | |
| 8,470,231 B1 | 6/2013 | Dikovsky et al. | |
| 9,863,713 B2 * | 1/2018 | Kaufmann | F28D 20/028 |
| 2003/0103880 A1 | 6/2003 | Bunk | |
| 2004/0231830 A1 | 12/2004 | Luo | |
| 2010/0051254 A1 | 3/2010 | Ipposhi et al. | |
| 2012/0152297 A1 | 6/2012 | Mitchell et al. | |
| 2013/0213611 A1 | 8/2013 | Wu | |
| 2014/0001670 A1 | 1/2014 | Drever | |
| 2014/0124158 A1 * | 5/2014 | Yamashita | F25D 11/006 165/10 |
| 2015/0113975 A1 * | 4/2015 | Riley | F03G 7/06 60/529 |
| 2015/0241136 A1 * | 8/2015 | Maeda | F28D 20/028 165/10 |
| 2016/0023336 A1 * | 1/2016 | Liu | B25C 1/04 227/2 |

* cited by examiner

PHASE CHANGE CELL

CROSS REFERENCE TO RELATED APPLICATIONS

This application is a divisional of U.S. patent application Ser. No. 15/239,461 filed Aug. 17, 2016, the entire contents of which are hereby incorporated by reference.

BACKGROUND

Phase change materials reliably change phase at a predetermined temperature to provide a repeatable temperature measurement. As heat is applied to a solid-liquid phase change material within a phase change cell, the temperature of the phase change material in a solid phase will rises until the material reaches its phase change temperature (the melting temperature). At this point, the phase change material will continue to absorb a significant amount of heat at a virtually constant temperature until all the material is transformed to the liquid phase. Likewise, the phase change material will release its stored latent heat energy at its phase change temperature in the transition from a liquid phase to a solid phase. This characteristic flattening of the temperature response of the phase change material during heating or cooling provides a stable, reliable indication of temperature.

High precision phase change cells are devices that encapsulate phase change materials and yield a measurable phase change temperature during a heating or cooling cycle. Such phase change cells can be used in a variety of contexts and environments to assist in temperature calibration. For example, climate systems, such as space-based climate systems utilizing optical instruments, must be periodically calibrated in order to provide accurate data. Without regular calibration, such instruments are subject to temperature drift that may impact the accuracy of the instruments. Various other climate systems require certain components to be accurately maintained or moved towards certain temperatures in order for these components to be properly operated and controlled.

Temperature readings provided by a phase change cell during a phase change can be used to calibrate temperature sensors. However, designs of existing phase change cell enclosures suffer from limitations in delivering accurate temperature measurements. Typically, the chamber inside the phase change cell containing the phase change material is partially filled with a gas pocket. Especially in microgravity environments, the location of the gas pocket within the chamber cannot be controlled and potentially could be adjacent to the wall of the phase change cell where the temperature sensor is located. This situation may result in an inaccurate reporting of the phase change material temperature, because the temperature of the gas pocket is measured instead of that of the phase change material.

Further, in some contexts it is desirable to measure the phase change temperature of several different materials in order to develop a temperature curve to support more accurate calibration using curve fitting. However, this technique generally requires a more complex phase change cell structure involving multiple chambers to separately house different phase change materials, together with corresponding controls and sensors.

SUMMARY

Described herein is a phase change cell that, according to one aspect, comprises a housing enclosing a phase change chamber. The housing includes a first end wall configured to be coupled to a heating and/or cooling source, a second end wall, and a side wall longitudinally extending between the first and second end walls. A phase change material occupies a majority of a volume of the phase change chamber and is configured to change between a solid phase and a liquid phase at a phase change temperature in response to heating or cooling. A gas pocket is disposed in the phase change chamber in communication with the phase change material. A capillary is disposed along a periphery of the phase change chamber and comprises a channel formed in an interior surface of the side wall. In response to heating of the phase change cell, the capillary is configured to draw the phase change material in a liquid phase towards the periphery of the phase change chamber. A temperature sensor is coupled to the housing in a vicinity of the capillary. The capillary can be one of a plurality of capillaries each comprising a channel formed in the interior surface of the side wall.

According to another aspect of the described phase change cell, the housing enclosing the phase change chamber includes a moveable surface that bounds a portion of the phase change chamber. The phase change material disposed in the phase change chamber has a phase change temperature that is a function of the pressure at which the phase change material is maintained in the phase change chamber. A controller controls the moveable surface to move between a first position at which the phase change chamber has a first volume that causes the phase change material to be at a first pressure, and second position at which the phase change chamber has a second volume that causes the phase change material to be at a second pressure that is different from the first pressure, such that the phase change material has first and second known phase change temperatures corresponding to the first and second pressures resulting from the moveable surface being in the first and second positions, respectively. According to one example implementation, an end wall of the housing can be a bimetallic disk that "pops" between a substantially flat shape below a certain temperature and a convex shape above that temperature. The controller can be a thermoelectric cooler capable of heating and cooling, controlled by a processor to heat and/or cool the bimetallic disk in accordance with a calibration process to perform measurements of the phase change temperature at plural different pressures.

The above and still further features and advantages of the described system will become apparent upon consideration of the following definitions, descriptions and descriptive figures of specific embodiments thereof wherein like reference numerals in the various figures are utilized to designate like components. While these descriptions go into specific details, it should be understood that variations may and do exist and would be apparent to those skilled in the art based on the descriptions herein.

DETAILED DESCRIPTION

One aspect of the described phase change cell involves introducing capillary structures on the inner surface of the wall of the chamber that houses the phase change material. The narrow channels of the capillaries enable capillary action to draw the phase change material in a liquid phase towards the wall and to prevent a gas pocket within the chamber from being positioned along the wall. In this manner, the temperature measured by a sensor disposed in the vicinity of a capillary accurately reflects the temperature of the phase change material within the chamber rather than a gas pocket within the chamber.

Figure 1:
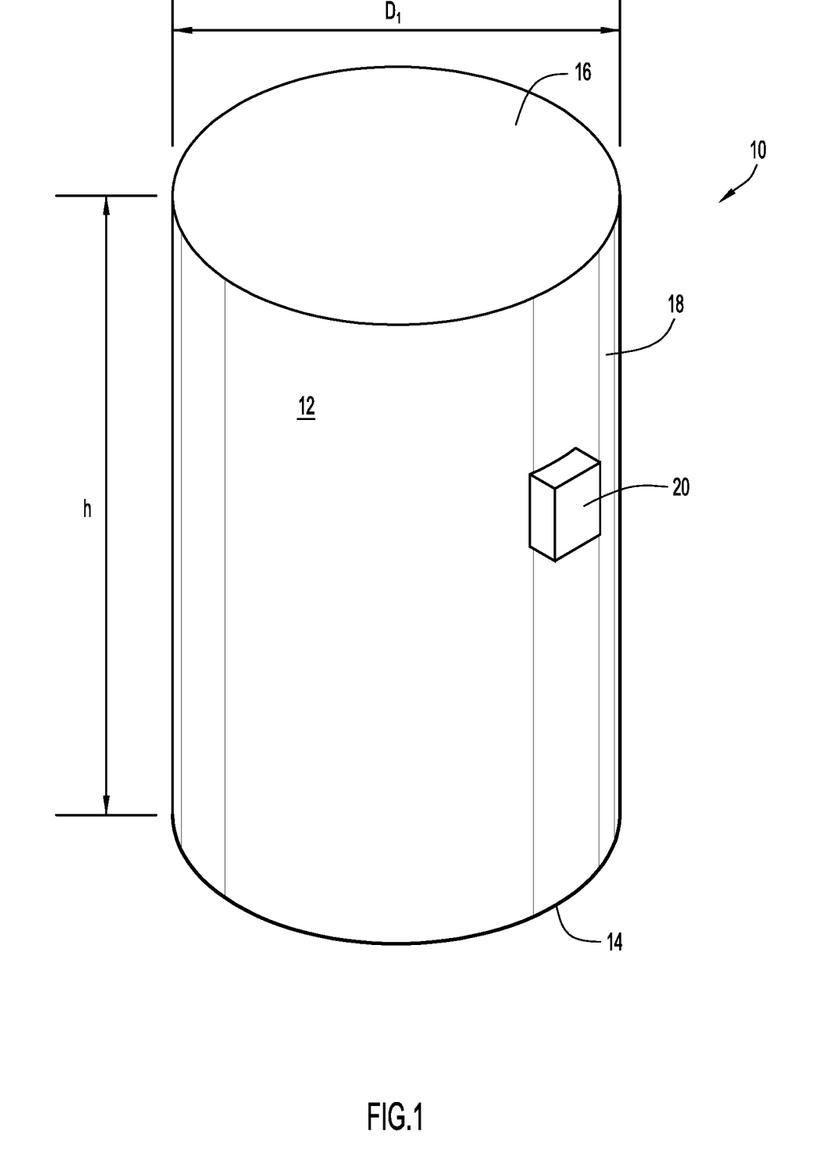
FIG. 1 is a perspective view showing the outer housing of a phase change cell described herein.

A phase change cell 10 according to a first embodiment is shown in perspective in FIG. 1. Phase change cell 10 includes a generally tube-shaped housing 12 comprising a first (e.g., bottom) end wall 14, a second (e.g., top) end wall 16, and a side wall 18 longitudinally extending between the first and second end walls 14, 16. In this example, the first and second end walls 14, 16 are substantially flat, circular disk-shaped end caps extending transversely to the longitudinal axis of phase change cell 10. Side wall 18 is cylindrically shaped with a circular transverse cross section and extends from end to end in the direction of the longitudinal axis. Side wall 18 is secured on its two longitudinal ends to first and second end walls 14, 16 to form a fully enclosed and sealed phase change chamber in the interior of phase change cell 10.

A temperature sensor 20, such as a thermocouple or a thermistor, is coupled to housing 12 at a point alongside wall 18. For convenience, temperature sensor 20 is shown in the figures as being attached to the outer surface of housing 12. However, temperature sensor 20 can be disposed on the inner surface of side wall 18, i.e., in the interior phase change chamber 22 within housing 12, or embedded into the material of housing 12. Thus, as used herein and in the claims, the term "coupled to the housing" encompasses the temperature sensor being positioned on the interior surface of the housing, the exterior surface of the housing, or embedded within the housing material.

The circular end walls 14, 16 and side wall 18 of housing 12 have an outer diameter $D_1$, and side wall 18 has a length (or height) h in the longitudinal direction. By way of a non-limiting example, outer diameter $D_1$ can be approximately 1 inch (about 2.5 cm) and length h can be approximately 2 inches (about 5 cm). While side wall 18 is cylindrical in the example shown in FIG. 1, more generally, the side wall can have any of a variety of ring-like transverse cross-sectional shapes, including: oval, elliptical, regular or irregular polygonal, and combinations of arcs, curved, and straight segments (e.g., the side wall can have multiple flat and/or curved faces). Further, the transverse cross-sectional area of the housing 12 need not be constant over the length of housing 12. Thus, as used herein and in the claims, a tube-shaped housing comprises a hollow body that extends along a longitudinal axis and that is enclosed at its two ends, the hollow body having any of a variety of ring-shaped transverse cross sectional shapes, including but not limited to those listed above. While both end walls are depicted as flat, circular disks in the embodiment shown in FIG. 1, the end walls can have any suitable shape that encloses the tubular housing. For example, if the side wall is shaped as an elongated hexagonal tube, the end walls can be flat (planar) hexagonal disks. More generally, the end walls need not be flat or planar. For example, the top end wall can be dome shaped and can be formed integrally with the side wall.

First (bottom) end wall 14 is configured to be coupled to a thermoelectric cooler (not shown) or other heating/cooling mechanism capable of heating and/or cooling phase change cell 10 to cause a phase change material within housing 12 to undergo a phase change between the liquid and solid phases (melt or solidify). As used herein and in the claims, a heating and/or cooling source includes devices capable of heating housing 12 (e.g., a resistance heater), devices capable of cooling housing 12 (e.g., a refrigeration mechanism), and devices capable of both heating and cooling housing 12 (e.g., a thermoelectric cooler). For example, at least a portion of first end wall 14 can be flat to provide good surface area contact with a thermoelectric cooler. It will be appreciated that the contour of the outer surface of first end wall 14 can be shaped to correspond to other surface shapes of a heating/cooling mechanism. Optionally, second (top) end wall 16 can also be configured to be coupled to a heating/cooling source. Note that temperature sensor 20 is positioned on side wall 18 at a significant distance from first end wall 14, e.g., on the upper half of side wall 18 to ensure that the temperature reading is not unduly influenced by the heating and/or cooling source.

Housing 12 comprises a material that is highly thermally conductive such that heating or cooling of the housing is readily conveyed through housing 12 to the phase change material contained in the phase change chamber inside housing 12. The material of housing 12 should also be non-reactive with the phase change material and any gases within the phase change chamber. By way of non-limiting examples, housing 12 can be made of stainless steel, aluminum, Teflon, beryllium, H2O, or (NIST) ITS-90 temperature scale materials or combinations thereof.

Any of a variety of manufacturing techniques can be used to make and assemble housing 12 of phase change cell 10 including extrusion, molds, and three-dimensional (3D) printing. Where end walls 14, 16 and side wall 18 are manufactured as separate components, any of a variety of mechanisms can be used to join end walls 14, 16 to side wall 18, including but not limited to: welding, epoxy, solder, screws, threaded surfaces, interlocking surfaces, and combinations thereof.

Figure 2:
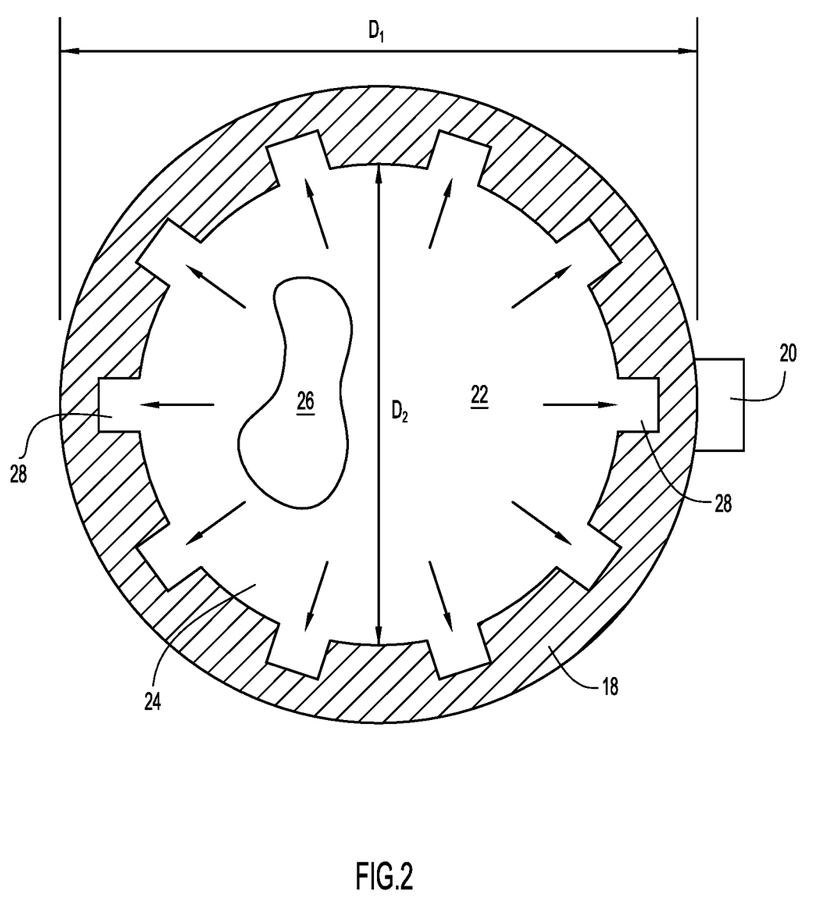
FIG. 2 is a transverse cross sectional view of the phase change cell shown in FIG. 1 taken along line II-II.

FIG. 2 is a transverse cross-sectional view of the phase change cell 10 shown in FIG. 1 taken along the line II-II. The interior phase change chamber 22 within housing 12 is air tight such that, under operational conditions, no solid, liquid, or gas contained in phase change chamber 22 can leak out of housing 12, and no solid, liquid, or gas can enter phase change chamber 22 from the exterior of housing 12. The inner diameter $D_2$ of housing 12 constitutes the diameter of phase change chamber 22. By way of a non-limiting example, the inner diameter $D_2$ can be approximately 0.9 inch (about 2.25 cm), and the cross-sectional thickness t of side wall 18 (in a radial direction) can be approximately 0.1 inch (about 2.5 mm).

A phase change material 24 is contained in phase change chamber 22 and fills the majority of the volume of phase change chamber 22. For example, phase change chamber 22 is at least 75% filled with phase change material 24. According to another example, phase change chamber 22 is as least 90% filled with phase change material 24. According to another example, phase change chamber 22 is at least 95% filled with phase change material 24. Phase change material 24 is capable of changing between the solid and liquid phases upon heating or cooling of an outer surface of housing 12. Phase change material 24 can be any of a wide variety of substances with a relatively high heat of fusion that, when melting and solidifying at a certain temperature (the phase change temperature), is capable of storing and releasing significant amounts of energy. For example, phase change material can be a metal with a relatively low melting temperature, such as gallium, gallium selenium, gallium indium, gallium tin, or mercury.

As a result of its phase change properties, when heat is applied to phase change material 24 in the solid phase, its temperature rises until it begins to melt. As heat continues to be applied, the temperature of phase change material 24 remains steady at the phase change temperature until it is completely melted. Once melted, further heating of phase change material 24 causes its temperature to increase. Likewise, when cooling is applied to phase change material 24 in the liquid phase, its temperature decreases until it begins to solidify. As cooling continues to be applied, the temperature of phase change material 24 remains steady at the phase change temperature until it is completely solidified. This characteristic response of phase change material 24 allows the phase change temperature to be readily measured during a phase change from solid to liquid or from liquid to solid. The phase change temperature measured by temperature sensor 20 can be used in a variety of ways to calibrate sensors and maintain a specific temperature of a component, an enclosure, or a system environment that employs phase change cell 10.

Since phase change material 24 may slightly expand or contract during phase changes, to avoid significant increases in internal pressure in chamber 22 and undesirable stress on sealing joints of housing 12 and to maintain a controlled pressure, phase change chamber 22 is also partially filled with a gas 26. Gas 26 is selected to be non-reactive with housing 12 and phase change material 24. By way of non-limiting examples, gas 26 is an inert gas such as nitrogen or a noble gas such as helium or argon, or combinations thereof. In general gas 26 is much more compressible than phase change material 24.

Figure 3A:
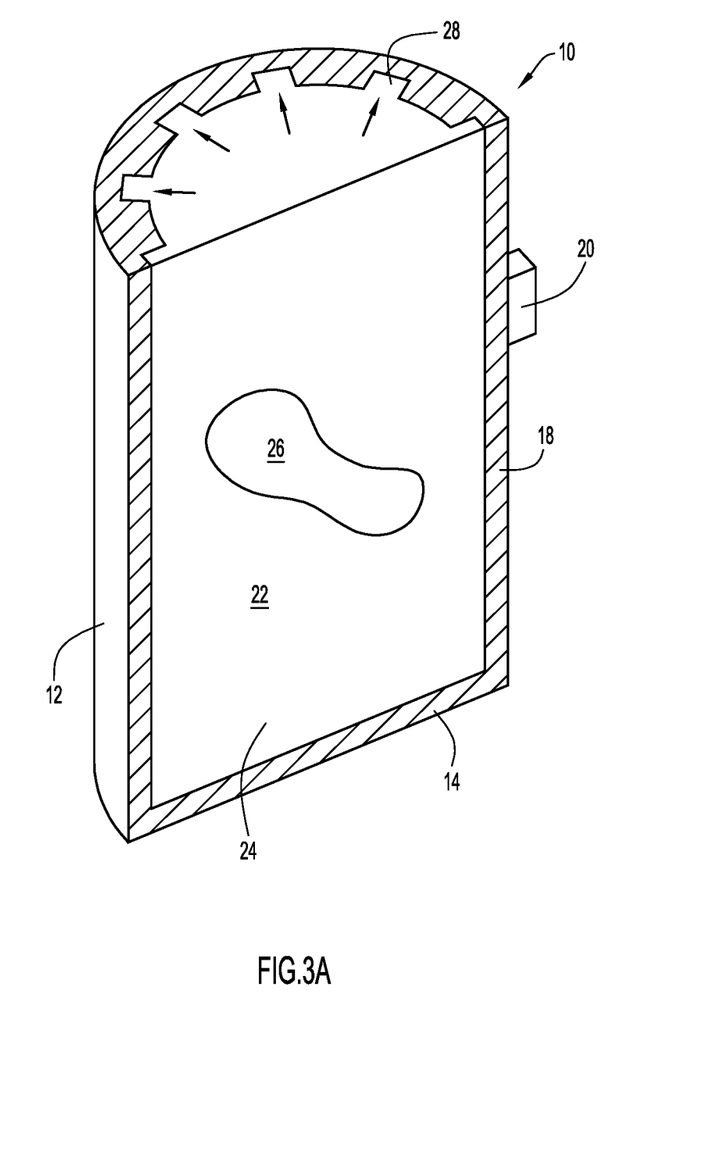
FIG. 3A is a cutaway view of the phase change cell of FIG. 1 illustrating the phase change material and gas pocket disposed in the interior phase change chamber.

Within phase change chamber 22, at least some of gas 26 may coalesce into a bubble or pocket of gas of a significant size. An example of such a gas pocket is shown in FIG. 2. FIG. 3A is a cutaway view of phase change cell 10 illustrating the interior of phase change chamber 22 in which gas pocket 26 is in communication with phase change material 24 (e.g., gas pocket 26 is entirely surrounded by phase change material 24 in this example). Particularly in a zero gravity or microgravity environment, such a gas pocket can form and float anywhere within phase change material 24 (in a liquid phase) inside phase change chamber 22. For example, a pocket of gas 26 could potentially drift to the edge of phase change chamber 22 and come into contact with the inner surface of side wall 18 adjacent to the position of temperature sensor 20. In this case, the temperature measured by temperature sensor 20 may at least partially reflect the temperature of the gas pocket instead of phase change material 24 itself. Since the temperature of the gas pocket can be significantly different from that of phase change material 24, having the gas pocket positioned against the inner surface of housing 12 in the vicinity of sensor 20 could potentially cause an inaccurate measurement of the phase change temperature of phase change material 24 contained in chamber 22.

Figure 3B:
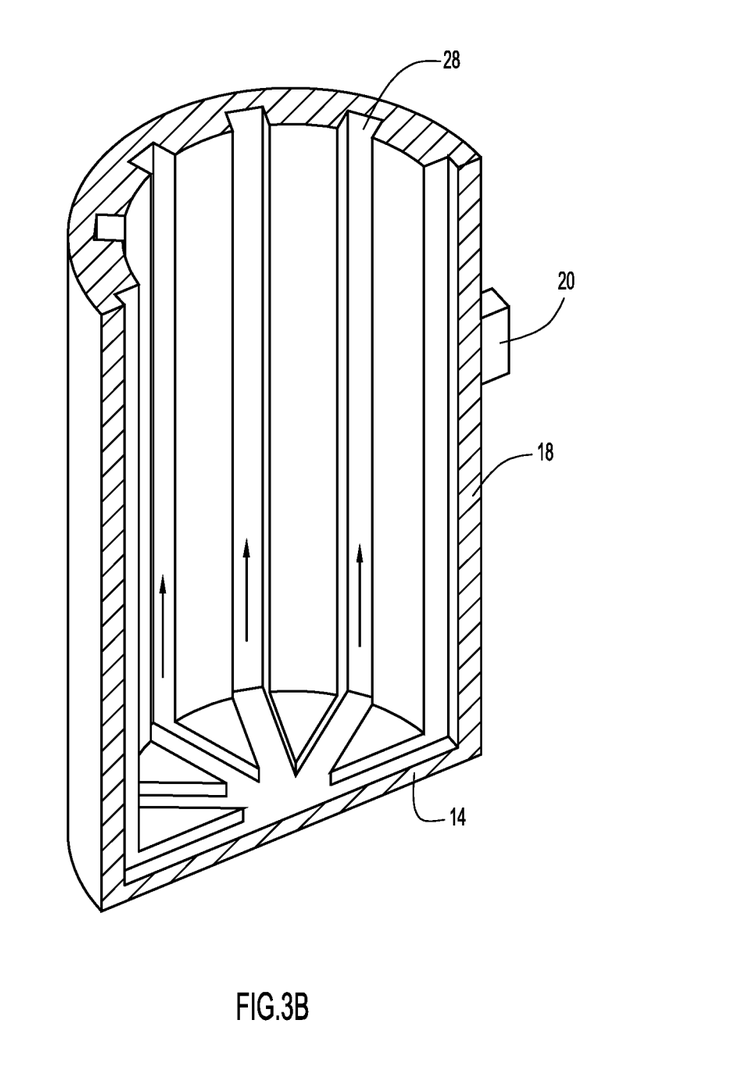
FIG. 3B is a cutaway view of the phase change cell of FIG. 1 with the phase change material removed to show an example configuration of capillaries formed in the wall of the phase change chamber.

To prevent a gas pocket from contacting the inner surface of housing 12 (the perimeter of phase change chamber 22), capillaries 28 are formed along the interior surface of side wall 18, as shown in FIG. 2. FIG. 3B is the same cutaway view of the phase change cell 10 as FIG. 3A but with the phase change material 24 removed to show an example configuration of capillaries 28 formed in the interior surface of side wall 18 at the periphery of phase change chamber 22. In particular, in this example, the capillaries comprise channels in the interior surface of side wall 18 such that each capillary is formed by the removal or absence of a portion of side wall 18. In the transverse cross-section shown in FIG. 2, each capillary 28 has a width in the circumferential direction and a depth in the radial direction. That is, the capillaries 28 (channels) extend outward (beyond the base inner diameter $D_2$ of side wall 18) and into side wall 18 such that the radial thickness of side wall 18 is somewhat diminished at the location of each capillary 28.

For ease of illustration, only ten capillaries are shown in FIGS. 2 and 3B and the width and depth dimensions of the capillaries are not necessarily to scale in the figures relative to the size of housing 12. In practice, any suitable number of capillaries can be formed in the interior surface of side wall 18. In the example shown in FIG. 3B, each capillary 28 extends along the entire length of side wall 18 from first end wall 14 to second end wall 16. Optionally, the capillaries formed in side wall 18 can further extend along the interior surfaces of first end wall 14 and/or second end wall 16. This arrangement is shown in FIG. 3B for first (bottom) end wall 14. According to another option, the capillaries may extend along only a portion of side wall 18, i.e., not the entire length of side wall 18 from the first end wall 14 to the second end wall 16. While the capillaries shown in the figures have an open construction along their length (i.e., having an opening to the phase change chamber 22), according to another option, the capillaries can have a closed, tube-like construction along at least a portion of their extent, with openings to the phase change chamber 22 at the ends of the capillaries.

In operation, capillaries 28 employ capillary action to draw phase change material 24 in a liquid phase into the narrow channels. Capillary action is the ability of a liquid to flow in narrow spaces without the assistance of external forces such as gravity as a result of intermolecular forces between the liquid and surrounding solid surfaces. If the cross-sectional area of the capillaries (channels) is sufficiently small, then the combination of surface tension and adhesive forces between the liquid and channel surfaces act to draw and lift the liquid.

The shape of housing 12 and the orientation of capillaries 28 facilitate the process of drawing the phase change material 24 in liquid phase into and through capillaries 28. Because the tube-shaped housing 12 is designed to be heated (and/or cooled) at one end, phase change cell 10 can behave in the manner of a heat pipe in terms of fluid flow. Specifically, as heat is applied to first end 14, a temporary heat flux (temperature differential) is created from the top end (cool) to the bottom end (hot) of phase change cell 10. In response to heating of phase change cell 10, capillaries 28 draw phase change material 24 in a liquid phase towards the periphery of phase change chamber 22. Specifically, as phase change material 24 begins to melt, it becomes a working fluid capable a conveying heat energy from the heated first end to the cooler second end. As suggested by the directional arrows in FIGS. 2 and 3A, the wicking action of capillaries 28, which extend from first end wall 14 to second end wall 16, draws the liquid phase change material 24 towards the interior surface of housing 12 (i.e., the outer wall of phase change chamber 22). The end-to-end temperature differential causes the liquid phase change material 24 to travel up through capillaries 28, away from heated first end wall 14 and towards second end wall 16, as suggested by the directional arrows in FIG. 3B.

With a sufficient number of spaced-apart capillaries 28, the liquid phase change material 24 contacts the entire interior surface of side wall 18, forcing any gas pockets towards the center of phase change chamber 22 and away from side walls 18. In this manner, regardless of where temperature sensor 20 is place along the circumference (perimeter) of the outer surface of side wall 18, temperature sensor 20 will be in the vicinity of one or more capillaries 28, thereby ensuring that temperature sensor 20 is measuring the temperature of phase change material 24 rather than the temperature of a gas pocket 26. Thus, as used herein and in the claims, the term "vicinity" refers to the temperature sensor being sufficiently close to a capillary to ensure that, when the phase change material in the liquid phase is being drawn towards and through the capillary, the temperature sensor is adjacent to the phase change material being drawn by the capillary and not adjacent to a gas pocket.

The cross-sectional dimensions of capillaries 28 must be sized to provide sufficient capillary action to pull the liquid phase change material into the channels and to lift the liquid phase change material through the channels from one end of phase change cell 10 to the other end in response to the end-to-end temperature differential. Such dimensions depend in part on the viscosity of the liquid phase change material 24. By way of a non-limiting example, the cross-sectional depth and width dimensions can be on the order of 0.05 to 0.1 inch (on the order of 1 to 2 mm), also depending in part on the thickness of housing 12.

Minimally, a single capillary can be formed on the inner surface of housing 12, provided the location of the single capillary is closely aligned with the position of temperature sensor 20. However, by distributing a plurality of capillaries along the perimeter of phase change chamber 22, precise placement of temperature sensor 20 becomes less critical, since with a sufficient number of capillaries, temperature sensor 20 will necessarily be in the vicinity of one or more of the capillaries, thereby simplifying the manufacturing process. Further, having a distributed array of capillaries enables use of multiple temperature sensors along the perimeter of housing 12 without the risk of a gas pocket being adjacent to any of the sensors. According to one example, the spacing between adjacent capillaries can be approximately the same as the circumferential width of the capillaries, such that about half of side wall 18 constitutes the capillary channels.

Figure 4:
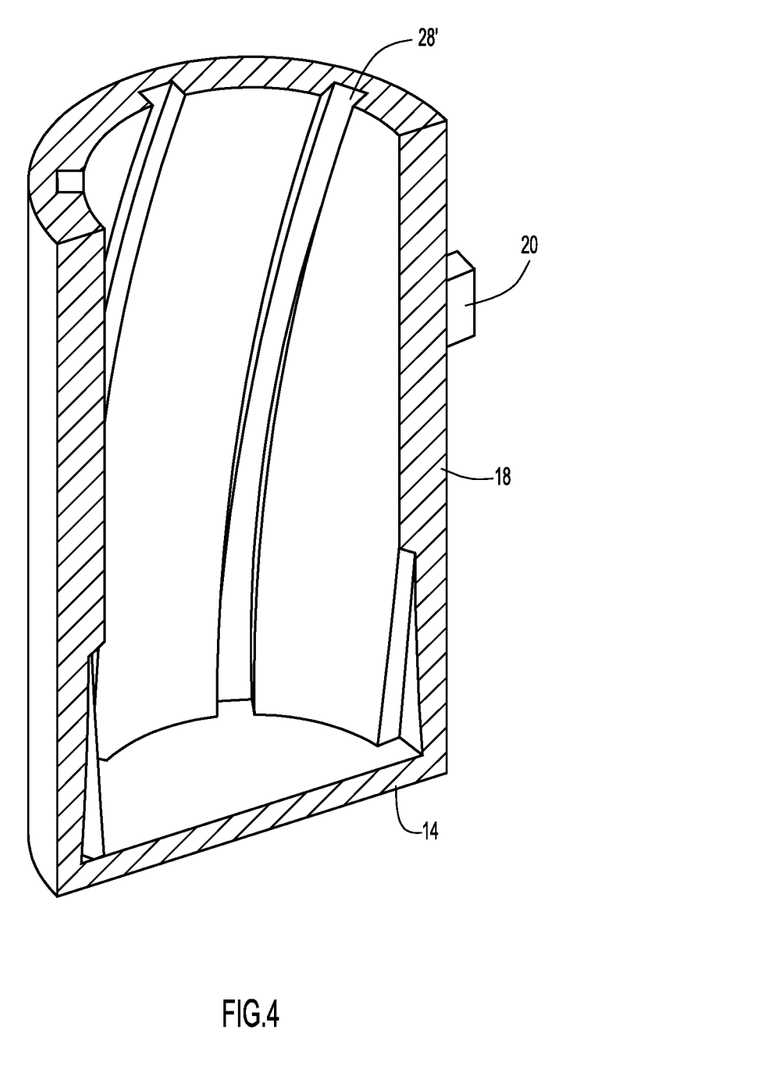
FIG. 4 is a cutaway view of the phase change cell of FIG. 1 with the phase change material removed to show another example configuration of capillaries formed in the wall of the phase change chamber.

While capillaries 28 shown in FIG. 3B extend linearly in the longitudinal direction alongside wall 18 between the first and second end walls 14, 16, it will be appreciated that the capillaries can have other configurations, provided the flow direction of the capillaries has at least some component in the longitudinal direction to allow the end-to-end heat flux to draw the liquid phase change material 24 through the capillaries. For example, as shown in FIG. 4, capillaries 28' can extends in a curved or helical (twist) pattern along side wall 18 between first and second end walls 14, 16. As with the previous drawings, only a few capillaries 28' are shown for ease of illustration, and the capillary dimensions and spacings are not necessarily to scale. Other possible capillary patterns include: a wavy or sinusoidal path, a zig-zag path, a meandering path, and a pseudo random path having a direction with a continuous longitudinal component. Further, the capillaries can be arranged to intersect, e.g., intersecting clockwise and counterclockwise helical patterns forming a diamond-shaped grid.

Figure 5A:
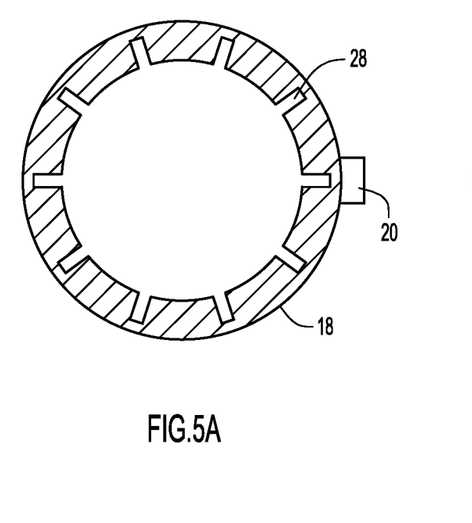
FIGS. 5A-5E are transverse cross sectional views of the side wall of a phase change cell showing several examples of cross-sectional shapes of the capillaries.
Figure 5B:
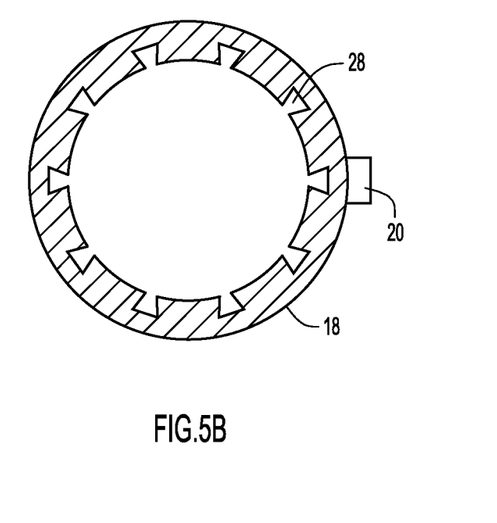
Figure 5C:
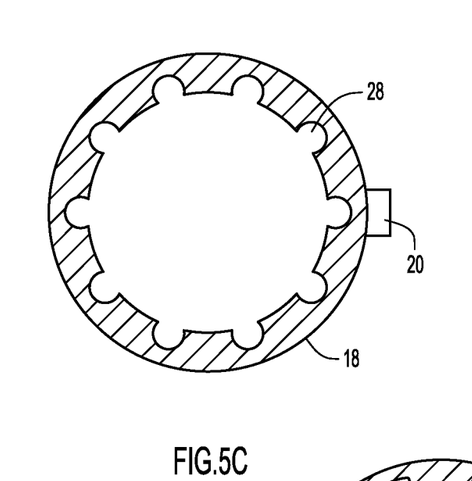
Figure 5D:
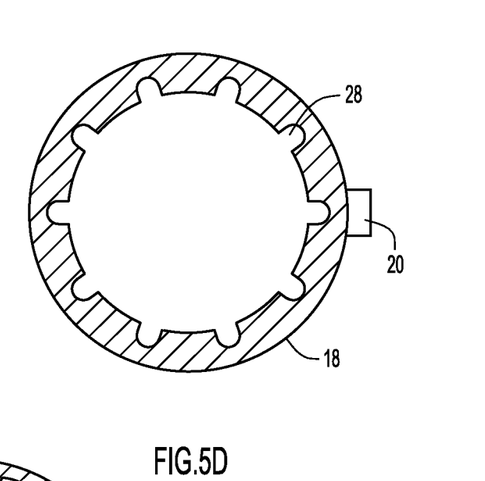
Figure 5E:
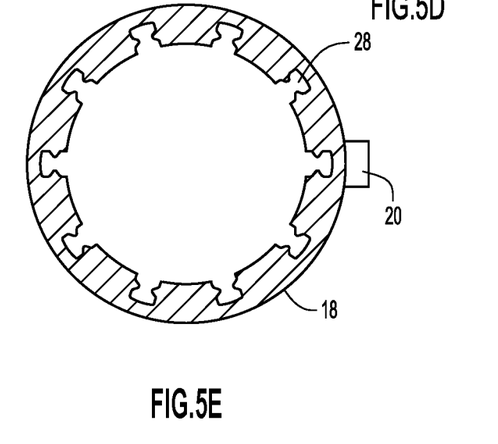

While capillaries 28 and 28' shown in FIGS. 2, 3A, 3B, and 4 comprise channels having a substantially rectangular cross-sectional shape, more generally, the capillary channels can have any cross-sectional shape suitable for drawing the liquid phase change material into the channels. For example, as shown in FIG. 5A, capillaries 28 can have a rectangular cross-sectional shape with a greater depth (in the radial direction) than width (in the circumferential direction). As shown in FIG. 5B, capillaries 28 can have a substantially trapezoidal cross section, e.g., with the circumferential width increasing with increasing radial depth into side wall 18. The cross-sectional shape of the capillaries can also be rounded, curved, or arched. For example, in FIG. 5C, capillaries 28 have a cross-sectional shape of most of a circle, such that the diameter of each capillary 28 initially increases as the radial depth increases and then diminishes in accordance with the shape of the circle. In FIG. 5D, the circumferential width of capillaries 28 is initially constant with increasing depth, but then decreases in accordance with the shape of semi-circle (partial race track shape). Finally, in FIG. 5E, capillaries 28 have an hour glass cross-sectional shape.

It will be appreciated that not all of the capillaries need to have the same cross-sectional shape or the same size or spacing from adjacent capillaries. Further, individual capillaries can vary in cross-sectional shape and size over their longitudinal extent to facilitate flow of the liquid phase change material (e.g., a capillary can become wider or narrower as it extends from one end to the other).

Because the capillaries extend along the length of the side wall, where the tubular side wall body is manufactured using extrusion techniques, it is possible to directly form the capillaries during the extrusion process rather than the alternative of subsequently machining an otherwise smooth interior surface of the tube. The capillaries can also be formed using the molding and 3D printing manufacturing techniques previously described.

As previously explained, it may be desirable to measure several different phase change temperatures (e.g., using different phase change materials) so that a curve of phase change temperatures can be developed to support more accurate calibration. However, this technique generally requires a more complex phase change cell structure involving multiple chambers to separately house different phase change materials, together with corresponding controls and sensors.

In accordance with another aspect of the described phase change cell, the cell housing includes a moveable surface that bounds a portion of the phase change chamber. By moving the moveable surface from one position to another position, the volume of the phase change chamber can be changed. According to the ideal gas law, $PV=nRT$, (where P is the gas pressure, V is the gas volume, n is the amount of gas, R is the universal gas constant, and T is the gas temperature), since the mass of the phase change material and the amount of gas within the phase change chamber is constant, at a given temperature, if the volume of the gas is decreased by decreasing the volume of the phase change chamber, then the pressure P of the gas (and hence the pressure within the phase change chamber) increases. Conversely, if the volume of the gas is increased by increasing the volume of the phase change chamber, then the pressure P of the gas (and hence the pressure within the phase change chamber) decreases. Thus, a change in volume of the phase change chamber results in an inversely proportional change in pressure on the phase change material. Since the phase change temperature of a phase change material is a function of pressure (the phase change temperature (melting point) decreases with increasing pressure), moving the moveable surface results in a different phase change temperature.

A controller controls the moveable surface to move between a first position at which the phase change chamber has a first volume that causes the phase change material to be at a first pressure, and second position at which the phase change chamber has a second volume that causes the phase change material to be at a second pressure that is different from the first pressure such that the phase change material has first and second phase change temperatures in response to the moveable surface being in the first and second positions, respectively. By cycling through phase changes of the phase change material at two or more pressure levels, and plurality of different phase change temperatures can be measured by a temperature sensor using only one phase change material in a single phase change chamber whose volume is variable. Thus, this phase change cell pressure control system avoids the need for multiple chambers and multiple different phase change materials to obtain multiple phase change temperature readings.

According to one implementation, the moveable surface of phase change chamber is a surface of a bimetallic sheet having a first shape when its temperature is below a shape-changing or "transition" temperature and a second shape when its temperature is above the transition temperature. A bimetallic sheet comprises two layers respectively composed of two different metals with different coefficients of thermal expansion. By way of non-limiting examples, the two layers can respective comprise steel and aluminum, steel and cooper, or steel and brass. Below a certain transition temperature, the bimetallic sheet has a certain shape, such as a flat or planar contour. As heat is applied to the bimetallic sheet, the two layers begin to expand at different rates, but this initially causes minimal deformation. As the bimetallic sheet reaches the transition temperature, it suddenly deforms, i.e., it "pops" or snaps into a second shape, such as a bowed or convex shape, and remains in that shape above the transition temperature. By lowering the temperature of the bimetallic sheet below the transition temperature, it snaps back to the first shape. Thus, the bimetallic sheet assumes two discrete shapes depending on its temperature.

Figure 6A:
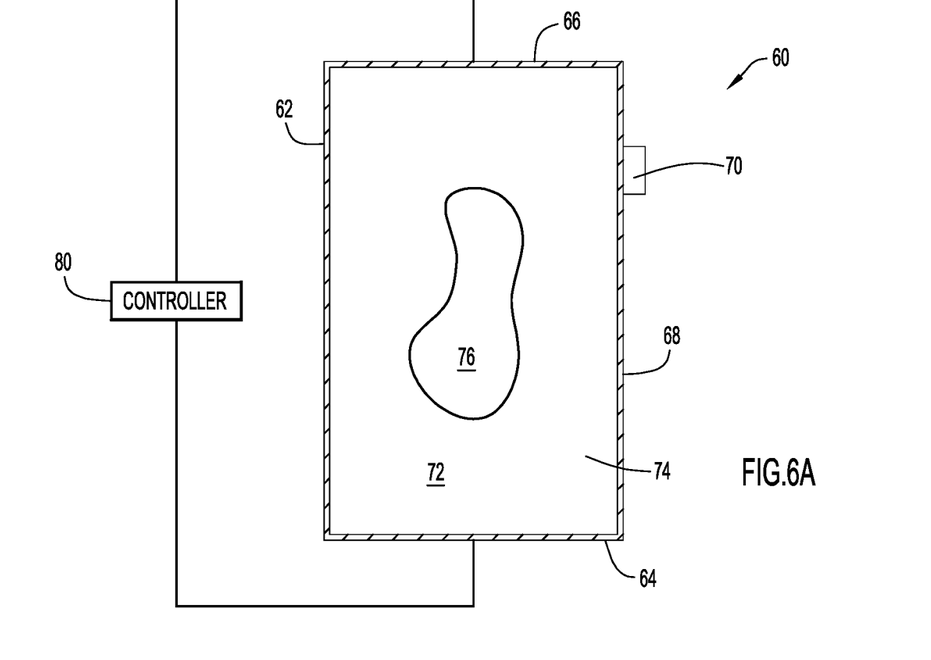
FIG. 6A is a longitudinal cross sectional view of a phase change cell having moveable surfaces that are in a first, substantially flat position.

By constructing one or more of the surfaces of the housing from a bimetallic sheet, the volume of the phase change chamber can be changed in a controllable manner between different discrete volumes. FIG. 6A is a longitudinal cross-sectional side view in elevation of an example implementation of a phase change cell 60 with two bimetallic surfaces, enabling the phase change cell to have several different volume/pressure configurations. While not shown in FIGS. 6A and 6B for ease of illustration, it will be appreciated that the capillary mechanism described in connection with FIGS. 1-5E can be employed along with the described volume control mechanisms in the same phase change cell. Similar to the phase change cell shown in FIG. 1, phase change cell 60 includes a generally tube-shaped (e.g., cylindrical) housing 62 comprising a first (e.g., bottom) end wall 64, a second (e.g., top) end wall 66, and a side wall 68 longitudinally extending between the first and second end walls 64, 66. In this example, each of first and second end walls 64, 66 comprises a circular bimetallic disk. By way of a non-limiting example, the bimetallic disks can have a thickness of approximately one to five hundredths of an inch (about 0.25 to 1.25 mm). The bimetallic disks can be affixed to side wall 18 using, for example, computer controlled electron beam welding or resistance welding.

In FIG. 6A, the bimetallic disk end walls 64, 66 are in their respective first positions and are substantially flat disks. Side wall 68 is secured on its two longitudinal ends to the first and second bimetallic disk end walls 64, 66 to form a fully enclosed and sealed phase change chamber in the interior of phase change cell 10. A temperature sensor 70, such as a thermocouple or a thermistor, is coupled to housing 72 at a point along side wall 78. Here again, while temperature sensor 70 is shown on the exterior surface of housing 72 for convenience, temperature sensor 70 can be disposed on an inner surface of housing 72 or embedded within the material of housing 72. A phase change material 74 is contained in phase change chamber 72 and fills the majority of the volume of phase change chamber 72. Phase change chamber 72 is also partially filled with a gas 76. Phase change material 74 and gas 76 can have the properties and compositions previously described in connection with implementation shown in FIGS. 2 and 3A.

A controller 80 is coupled to bimetallic disks 74, 76 and is configured to independently control the temperatures of the bimetallic disks to cause the disks to switch between two discrete shapes. For example, controller 80 can comprise two thermoelectric coolers respectively coupled to the first and second bimetallic disk end walls 64, 66, and a processor that controls the thermoelectric coolers in accordance with a multi-cycle phase change sequence.

The processor of controller 80 essentially performs certain operations to carry out a multi-cycle phase change sequence and can be implemented in hardware, software, or a combination of hardware and software, as appropriate. For example, the processor can include one or more microprocessors, microcontrollers, or digital signal processors capable of executing program instructions (i.e., software) for carrying out at least some of the various operations and tasks to be performed by controller 80. Controller further includes one or more memory or storage devices to store a variety of data and software instructions (control logic) for execution by the processor. The memory may comprise read only memory (ROM), random access memory (RAM), magnetic disk storage media devices, optical storage media devices, solid-state memory devices, flash memory devices, electrical, optical, or other physical/tangible (e.g., non-transitory) memory storage devices. Thus, in general, the memory comprises one or more tangible (non-transitory) processor-readable or computer-readable storage media that stores or is encoded with instructions (e.g., control logic/software) that, when executed by the processor, cause the processor to perform the operations described herein below. One or more of the components of controller 80 can also be implemented in hardware as a fixed data or signal processing element, such as an application specific integrated circuit (ASIC) that is configured, through fixed hardware logic, to perform certain functions. Yet another possible processing environment is one involving one or more field programmable logic devices (e.g., FPGAs), or a combination of fixed processing elements and programmable logic devices.

Figure 6B:
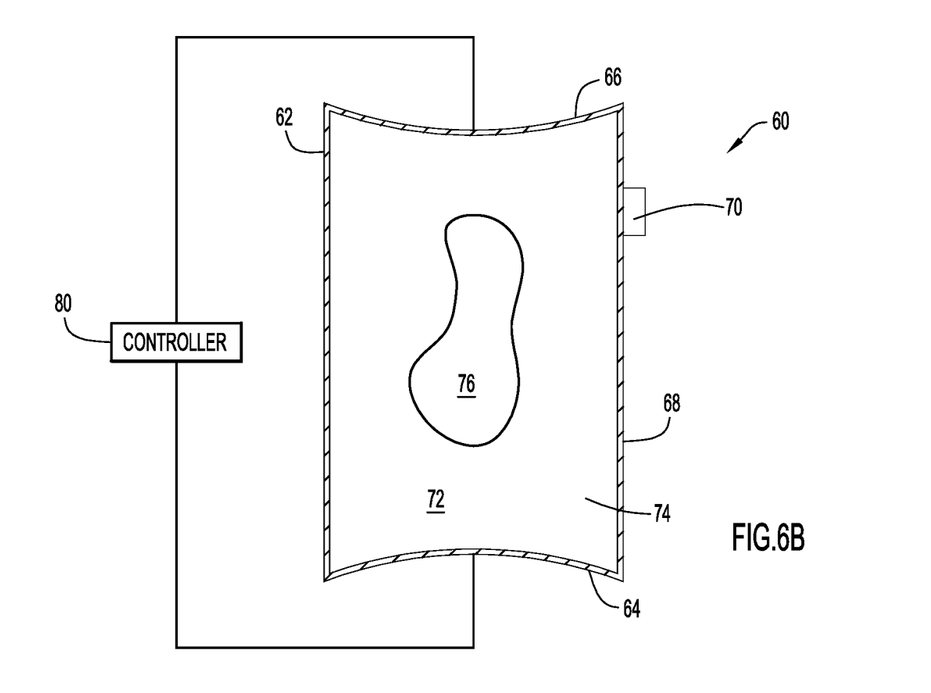
FIG. 6B is a longitudinal cross-sectional view of the phase change cell of FIG. 6A wherein the moveable surfaces are in a second, bowed position.

FIG. 6B shows the first and second bimetallic disk end walls 64, 66 in their respective second shapes in which the disks are bowed inward (convex on the side facing phase change chamber 72) to reduce the volume of phase change chamber 72. In this case, controller 80 applies heat via respective first and second thermoelectric coolers (not shown) to first and second bimetallic disks 64, 66. Once the bimetallic disks are heated past their transition temperature, they deform to the bowed shape, thereby moving to their respective second positions. By separately controlling the two bimetallic disks, three different volume configurations and three corresponding phase change temperatures can be achieved. Specifically, a first, largest volume results from controlling both bimetallic disks 64, 66 to be in their respective first shapes/positions as shown in FIG. 6A (i.e., both disks are flat). A second, smaller volume results from controlling one of the bimetallic disks 64, 66 to be in its first, flat shape/position and the other of the bimetallic disks to be in its second, bowed shape/position. A third, smallest volume results from controlling both bimetallic disks 64, 66 to be in their second, bowed shape/position.

Note that is possible to make other surfaces of phase change chamber 72 controllable via this same bimetallic mechanism. For example, side wall 18 can be constructed from a bimetallic sheet shaped into a cylinder in a first shape/position. Upon heating side wall 18 above its transition temperature, it deforms into a hyperboloid shape, thereby reducing the volume of phase change chamber 72. While the example shown in FIGS. 6A and 6B employ bimetallic sheets (disks) that bow inward, it will be appreciated that a bimetallic sheet can be oriented relative to the phase change chamber to bow outward instead of inward to effect a volume change.

The temperature of the bimetallic sheet(s) can be controlled as part of the heating or cooling of the phase change material. Alternatively, the temperature of the bimetallic sheet(s) can be controllable independent of the heating or cooling of the phase change material (e.g., different thermoelectric coolers can be responsible for heating and cooling the phase change material and a bimetallic sheet). Depending on whether the heating or cooling of the bimetallic sheet(s) is incorporated into the heating or cooling of the phase change material, measures can be employed to provide some degree of thermal isolation between the bimetallic surfaces and the phase change material (e.g., an insulating layer on the interior surface of the bimetallic sheet(s)).

In addition to the bimetallic sheet mechanism, any of a wide variety of other volume control mechanisms can be employed to provide one or moveable surfaces within a phase change chamber to change the volume between discrete states. For example, piezoelectric surfaces that deform in response to an electric current or electric field can be placed within the phase change chamber to modify its volume. According to another option, one or more of the housing walls can be mechanically moved relative to the other walls using an actuator, servomotor, or the like. According to yet another option, the volume of the phase change chamber can be modified by selective inserting and withdrawing an object or mass into the chamber. For example, a screw mechanism can be used to control the extent to which an object protrudes into the chamber from one of the housing walls. According to still another option, a hydro-mechanical device can be disposed in the phase change chamber. For example, the hydro-mechanical device can comprise an encapsulated region of fluid whose properties can be used to change the volume of the phase change chamber.

Figure 7:
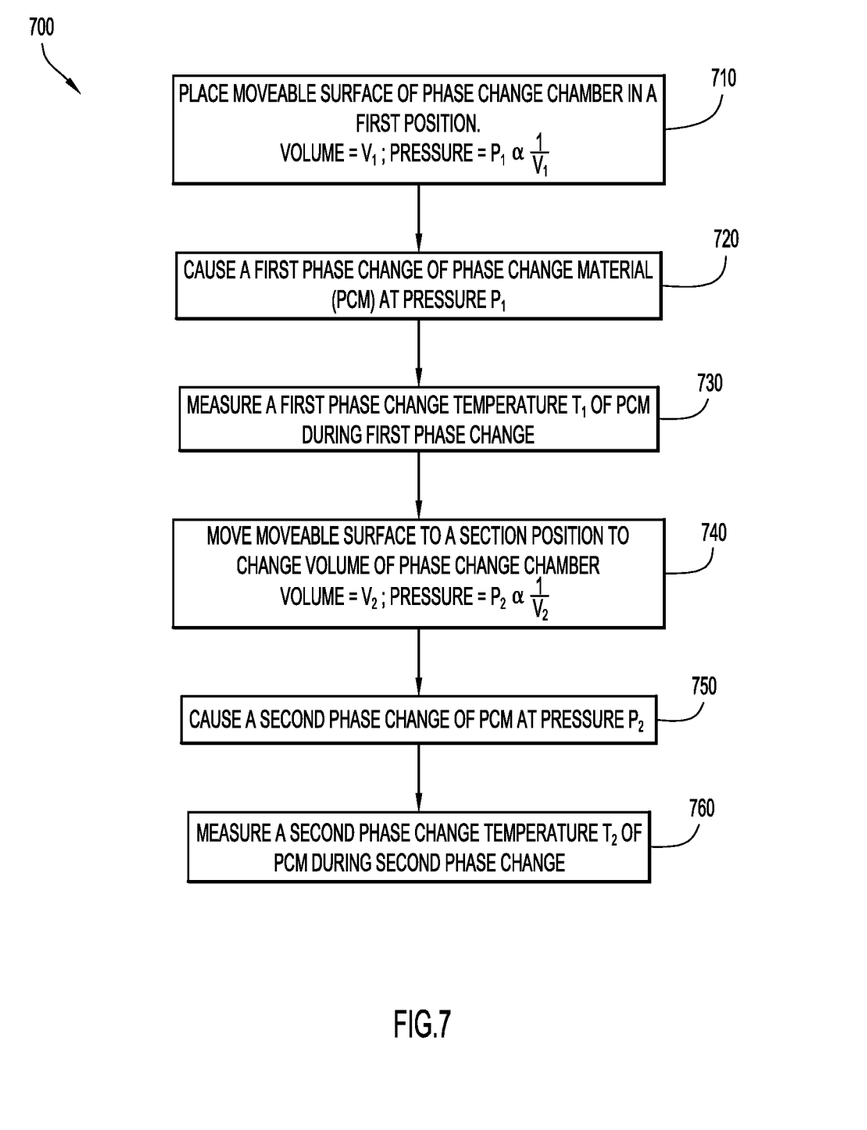
FIG. 7 is a flow diagram illustrating operations performed to measure multiple phase change temperatures with a single phase change cell in different volume configurations.

FIG. 7 is a flow chart 700 illustrating operations performed to measure two different phase change temperatures using a single, volume-controlled phase change cell. Initially, in operation 710, a moveable surface of a phase change chamber is placed in a first position, resulting in the phase change chamber have a first volume $V_1$ and a first pressure $P_1$ that is inversely proportional to volume $V_1$. In operation 720, heating or cooling is applied to the phase change cell (e.g., via a thermoelectric cooler) to cause a first phase change of the phase change material from the solid phase to the liquid phase (melting) or from the liquid phase to the solid phase (solidifying). As used herein and in the claims, a phase change "between the solid phase and the liquid phase" can be either melting or solidifying. During the first phase change, the phase change temperature $T_1$ of the phase change material is measured by a temperature sensor in operation 730.

In operation 740, the moveable surface of the phase change chamber is moved to a second position, resulting in the phase change chamber have a second volume $V_2$ ($V_2 \neq V_1$) and a second $P_2$ ($P_2 \neq P_1$) that is inversely proportional to volume $V_2$. Preferably, the phase change material is in a liquid phase while the moveable surface is moved to minimize the resistance to moving. In operation 750, heating or cooling is applied to the phase change cell (e.g., via a thermoelectric cooler) to cause a second phase change of the phase change material from the solid phase to the liquid phase (melting) or from the liquid phase to the solid phase (solidifying). If the phase change material is in a liquid state while the moveable surface is moved, and a melting phase change is used for the second phase change, an intervening operation of re-solidifying the phase change material is required. During the second phase change, the phase change temperature $T_2$ ($T_2 \neq T_1$) of the phase change material is measured by the temperature sensor in operation 760.

Additional phase change temperatures can be measured by further changing the volume of the phase change chamber. For example, the moveable surface can be moved to a third position resulting in the phase change chamber have a third volume $V_3$ ($V_3 \neq V_1$ or $V_2$) and a third pressure $P_3$ ($P_3 \neq P_1$ or $P_2$) that is inversely proportional to volume $V_3$, and the phase change temperature $T_3$ is measured during a third phase change. According to another option, another moveable surface that bounds the phase change chamber can be moved to produce the third volume. For example, the moveable surfaces can surfaces of two different bimetallic sheets, such as bimetallic disks forming the top and bottom walls of a cylindrical phase change cell. In general, any practical number of discrete phase change chamber pressure levels and corresponding phase change temperatures can be achieved by controlling the position of one moveable surface or the positions of plural moveable surfaces in concert to create different discrete volumes within the same phase change chamber. In this manner, a simplified phase change cell design can be used to acquire a temperature calibration curve having several different phase change temperatures.

Having described example embodiments of a phase change cell, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A phase change cell, comprising:
a housing enclosing a phase change chamber and configured to be coupled to a heating and/or cooling source, the housing including a moveable surface bounding a portion of the phase change chamber, wherein the moveable surface is a surface of a bimetallic sheet having a first shape when its temperature is below a transition temperature and a second shape when its temperature is above the transition temperature;
a phase change material disposed in the phase change chamber, the phase change material being configured to change between a solid phase and a liquid phase at a phase change temperature in response to heating or cooling, the phase change temperature being a function of a pressure at which the phase change material is maintained in the phase change chamber; and
a controller configured to change the temperature of the bimetallic sheet to cause the moveable surface to move between a first position at which the phase change chamber has a first volume that causes the phase change material to be at a first pressure, and second position at which the phase change chamber has a second volume that causes the phase change material to be at a second pressure that is different from the first pressure such that the phase change material has first and second known phase change temperatures corresponding to the first and second pressures resulting from the moveable surface being in the first and second positions, respectively; and
a temperature sensor to measure a temperature of the phase change material.

2. The phase change cell of claim 1, wherein:
the housing comprises a first end wall, a second end wall, and a side wall longitudinally extending between the first and second end walls, the first end wall comprising the bimetallic sheet, wherein the first shape is substantially flat and the second shape is bowed inward to reduce the volume of the phase change chamber.

3. The phase change cell of claim 2, further comprising a capillary channel disposed in an interior surface of the side wall in a vicinity of the temperature sensor, wherein in response to heating of the phase change cell, the capillary channel is configured to draw the phase change material in a liquid phase towards a periphery of the phase change chamber.

4. The phase change cell of claim 1, wherein the temperature of the bimetallic sheet is controllable independent of the temperature of the phase change material.

5. The phase change cell of claim 1, further comprising a second moveable surface bounding another portion of the phase change chamber, wherein the controller is configured to control the second moveable surface to move between first and second positions, and wherein positions of the moveable surface and the second moveable surface are selectable by the controller to configure the phase change chamber to have a third volume that causes the phase change material to be at a third pressure that is different from the first and second pressures such that the phase change material has a third known phase change temperature corresponding to the third pressure.

* * * * *